Dec. 18, 1934.  C. H. RUMPEL  1,984,995
TESTING DEVICE
Filed Nov. 2, 1933
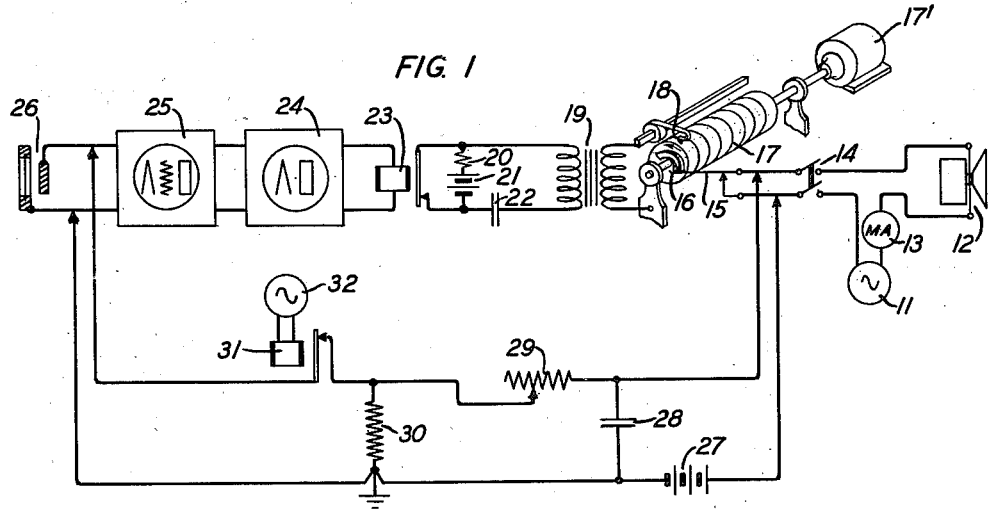
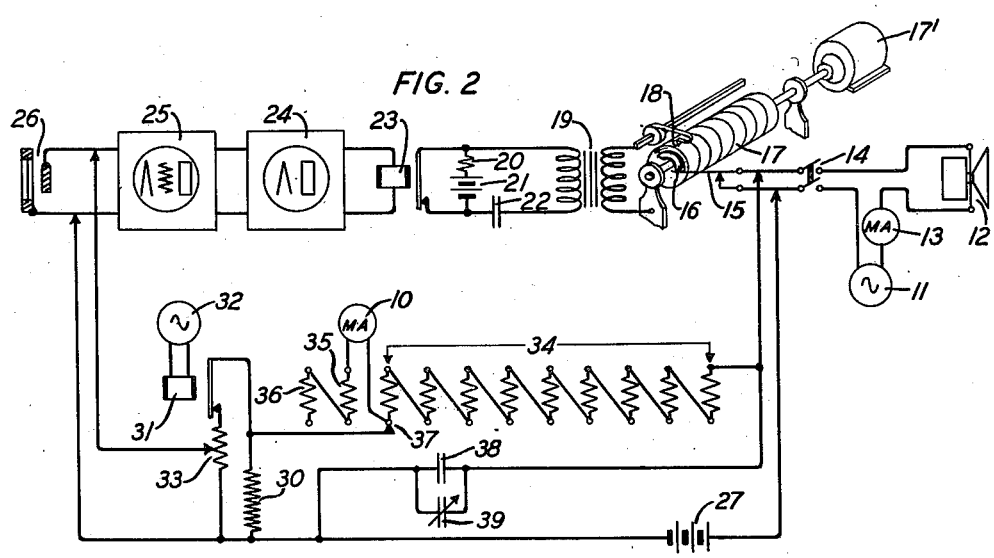
INVENTOR
C. H. RUMPEL
BY
*G. M. Rumpel*
ATTORNEY Patented Dec. 18, 1934

1,984,995

UNITED STATES PATENT OFFICE 1,984,995

TESTING DEVICE

Carl H. Rumpel, New York, N. Y., assignor to Bell Telephone Laboratories, Incorporated, New York, N. Y., a corporation of New York Application November 2, 1933, Serial No. 696,299

5 Claims. (Cl. 181—0.5)

This invention relates generally to testing systems and more particularly to a device for testing reverberation meters or similar acoustic instruments used to determine the rate of decay of sound energy in an open or closed space.

The general object of the invention is to provide a precision method of calibrating or checking the operation of apparatus used to measure the rate of decay of sound energy. If a sound is established in a hall or room and its source is suddenly cut off the sound will not cease instantly but will take a fraction of a second or longer to disappear. The time required for the sound energy to decrease to one one-millionth of its previous level is called the reverberation time. A convenient term used to measure sound energy changes is the exponential function called the decibel (abbreviated db.) which is defined by the relation $$N = 10 \log_{10} \frac{P_1}{P_2}$$

where N is the number of decibels by which any two powers $P_1$ and $P_2$ differ. In terms of this unit, therefore, the reverberation time may be defined as the time required for the sound energy to decrease 60 decibels. The decay of sound is also, in general, an exponential function of time, that is, the energy of the sound decreases by the same percentage during equal intervals of time, and for this and other reasons the decay is measured in decibels. A plot of an exponential sound decay measured in decibels versus time will therefore be a straight line the slope of which is a measure of the rate of decay.

The method preferably consists in generating an alternating electrical current the amplitude of which decreases from a given instant, exponentially with time and at a known and predetermined rate, and then using this source of energy to operate the acoustic measuring device which if accurate, should produce a straight-line relation between the time and decay and should indicate a rate identical with the predetermined rate.

The invention is carried out by providing a circuit in which the direct current discharge of a condenser through a resistance is used as a source of decaying energy and part of the voltage drop so obtained is modulated to actuate the acoustical measuring device. The input to the measuring device thus varies according to the discharge current of the condenser through the discharge circuit. In this manner two measures of the rate of decay for a single energy source may be obtained, one a calculated measure, obtained from the values of the elements used in the artificial sound source and the other a graphic measure obtained from the indicating means of the measuring device being tested. The calculated measure is, of course, the true measure and the graphic measure should correspond with it if the measuring device is to be accurate.

In order to calculate the rate of decay from the elements of the artificial sound source the following equation is used:

$$i = \frac{E}{R} \epsilon^{\frac{-t}{RC}}$$

Where R = resistance in ohms of the discharge circuit.

C = capacity in farads of the condenser
$\epsilon$ = base of the natural logarithms
t = time in seconds
E = voltage to which the condenser was charged originally.

Since the reverberation time is measured by the slope of the straight line obtained by plotting the decay in decibels versus time, the value of E is of no consequence. The time $t$ for the current $i$ to decay to any fraction of a former value may be easily calculated from the constants R and C.

Referring now to the drawing:

Fig. 1 shows schematically an illustrative circuit for measuring the rate of decay of sound energy and an elementary wiring diagram of the testing or calibrating circuit connected thereto; and Fig. 2 shows in greater detail the novel testing circuit.

In Fig. 1, the apparatus 11 to 26 inclusive, comprises a typical device for measuring the rate of decay of sound waves, and 27 to 32 inclusive, the testing means for the measuring device. The general theory of such a measuring device may be briefly described as follows: A source of alternating current 11 of desired frequency is connected through the milliammeter 13, switches 14 and 15 to the loud-speaker 12. The sound produced by the loud-speaker 12 is picked up by the microphone 26, which is placed at the position where the decay characteristic is to be measured, amplified by the amplifier 25, rectified by the rectifier 24 and the rectified current is utilized to energize a relay 23. If the gain of the amplifier is such that the sound is loud enough to produce a current sufficient to operate the relay 23 it is apparent that if the sound is cut off the current through the relay 23 may be reduced to a point where the relay 23 will release. By varying the gain of the amplifier 25 the relay 23 may be made to release at various points along the sound decay curve which correspond to the gain setting of the amplifier 25. If, therefore, the gain of the amplifier 25 is adjusted in successive steps of, say, 3 decibels each, and the time is measured for relay 23 to release each time the sound source is cut off, a plot of the sound decay in decibels versus time may be obtained.

The form of measuring device chosen to illustrate this invention is known as a reverberation meter and is so arranged as to plot automatically the sound decay curve. The source of alternating current 11 which energizes the loud-speaker 12 is interrupted by the switch 15 which is actuated by the extension 16 on the revolving drum 17 coincident with a predetermined mark on the drum 17. The drum 17 is driven by a suitable motor 17' and continues to revolve at a known rate before and after the sound source is cut off. On the release of the relay 23, a spark is caused to jump between the contact 18 and the drum 17 due to the discharge of condenser 22 through coil 19 and the spark makes a point on a prepared paper placed on the drum 17. By moving the contact 18 parallel to the axis of the drum 17 a definite distance corresponding to each gain setting of the amplifier 25 a plot of the decay curve may be recorded on the prepared paper.

The operation of the calibrating or testing circuit will now be described and it is initiated by opening switch 14 and connecting the testing circuit comprising elements 27 to 32 inclusive to the measuring device as indicated by the arrows associated with the testing circuit. In this testing circuit, the battery 27 charges the condenser 28 to its steady maximum value when the switch 15 is closed. On opening switch 15, the remaining charge in the condenser 28 passes through the resistances 29 and 30 connected in series, the discharge current decaying in accordance with the law previously stated. Resistance 30 is negligibly small compared to the resistance 29. The potential drop established by the current flow through resistance 30 is interrupted by the vibrating relay 31 at a rate determined by the frequency of the alternating current generator 32. It is apparent that the testing device will now perform the functions of the acoustical wave generating apparatus 11, 12 and 13 in furnishing an exponentially decaying input to the measuring device, and that the accuracy of the plot of the sound decay curve as recorded on the prepared paper placed on the drum 17 may be easily determined by comparison with the theoretical values and slope as calculated from the equation given above.

Fig. 2 represents the details of the elements of the testing device. These elements are fundamentally the same as the elements of the device of Fig. 1 except that various adjusting means are added to make the device more practicable. The charging energy for the condensers 38 and 39 is supplied by battery 27. Condenser 39 is a small adjustable condenser which is employed to compensate for small variations in capacity which may occur in the main condenser 38 over a period of time. The adjustable resistance 34 in conjunction with the resistance 30 determines the rate of decay of the condenser discharge, and the resistance values between taps may be selected and marked to facilitate setting the apparatus to produce a predetermined rate of decay for each setting of the adjustable contact 37. Resistance 30 is negligibly small compared to resistance 34 and potentiometer 33, hence, the condenser discharge current flowing through the potentiometer 33 is not of large enough magnitude to cause appreciable error in the accuracy of the testing device. Potentiometer 33 provides a means of adjusting the relative magnitude of the voltage applied to the measuring device. By this means, it is possible to attenuate to any desired degree the voltage established by the voltage drop across the resistance 30 and modulated by the vibrating relay 31. The alternating current generator 32 and the vibrating relay 31 provide a means of varying the modulating frequencies to any desired value by adjusting the frequency of the generator 32.

The calculated value of the rate of decay depends upon the values used for the resistance and capacity in the testing circuit and it is important, therefore, that these values be correct. Of the two, the capacity is the most likely to change. In order to check at any time the combined parallel capacity of the condensers 38 and 39, meter 10 and resistances 35 and 36 have been provided. By means of these elements and in knowing the combined series resistance of resistances 35, 36, 30 and 34, the capacity of the combined condensers 38 and 39 may be determined. The procedure is as follows: The condensers 38 and 39 are charged by the battery 27 through the closed contacts of switch 15. Under the steady state condition, before the switch 15 is opened the current reading of the meter 10 is noted. The switch 15 is then opened and the condensers 38 and 39 discharge through the series resistances 34, 35, 36 and 30. The time necessary for the current indicated by the meter 10 to decrease to a fraction of its normal value, say ½, may be determined by means of a stop watch or other suitable timing device. The resistances 35 and 36 are made sufficiently large to give a long decay period in order that an accurate determination of the time interval may be obtained. From the equation for the discharge of a condenser through a resistance, it may be shown that when $t=RC$, the current will have decayed to $$\frac{1}{e}$$

of its original value or 8.66 decibels. The time required to decay 60 decibels will then be $$\frac{RC \times 60}{8.66},$$

and from the measured time and the known value of R, C may be determined.

What is claimed is:

1. A method for testing a reverberation meter which consists in utilizing the direct current discharge of a condenser through a resistance, modulating the potential drop so obtained across said resistance to actuate said reverberation meter, and determining the interval of time it takes said modulated voltage to fall from one value to another.

2. In a testing device for reverberation meters, a source of direct current energy, a condenser to be charged to the potential of said source, means for disconnecting said source, a resistance in the discharge circuit of said condenser, and means for modulating the potential drop across said resistance, said means comprising a vibrating relay.

3. In combination a reverberation meter, a testing device for said meter, said device comprising a source of direct current energy, a condenser to be charged to the potential of said source, a variable resistance and a constant resistance connected in series through which said condenser continually discharges, said reverberation meter being coupled to said testing circuit across said constant resistance, a vibrating relay in series with the input of said reverberation meter, and means on said reverberation meter to cut out said source of energy to said condenser.

4. In combination a reverberation meter, a testing device for said meter and a means for determining the capacity of a condenser in said testing device, said means comprising a source of direct current, means for connecting said source to said condenser, a variable resistance and a constant resistance connected in series with a meter through which said condenser continually discharges, said reverberation meter being coupled to said testing circuit across said constant resistance, a current modulating means in series with the input of said reverberation meter, and means on said reverberation meter to cut out said source of energy to said condenser.

5. In a testing device, a condenser, a source of direct current for charging said condenser, means for disconnecting said source from said condenser, a discharge circuit in which the current discharged from said condenser decays at a predetermined rate, and a source of alternating current associated with said discharge circuit for modulating the decayed current therein.

CARL H. RUMPEL.